United States Patent
Tsuzaka et al.

(10) Patent No.: US 9,732,245 B2
(45) Date of Patent: Aug. 15, 2017

(54) WATER-BASED INK FOR INK-JET RECORDING AND INK CARTRIDGE

(71) Applicant: Brother Kogyo Kabushiki Kaisha, Nagoya-shi, Aichi-ken (JP)

(72) Inventors: Yuka Tsuzaka, Nagoya (JP); Taro Nagano, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 66 days.

(21) Appl. No.: 14/859,674

(22) Filed: Sep. 21, 2015

(65) Prior Publication Data
US 2016/0090498 A1 Mar. 31, 2016

(30) Foreign Application Priority Data
Sep. 29, 2014 (JP) .................. 2014-199316

(51) Int. Cl.
*B41J 2/01* (2006.01)
*C09D 11/38* (2014.01)
(Continued)

(52) U.S. Cl.
CPC ............ *C09D 11/38* (2013.01); *B41J 2/2107* (2013.01); *C09D 11/322* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38;
(Continued)

(56) References Cited

U.S. PATENT DOCUMENTS 5,609,671 A 3/1997 Nagasawa
5,837,045 A 11/1998 Johnson et al.
(Continued)

FOREIGN PATENT DOCUMENTS

EP 1803783 A1 7/2007
EP 1818372 A1 8/2007
(Continued)

OTHER PUBLICATIONS

Feb. 16, 2016—(EP) Extended European Search Report—App 15185941.0.

*Primary Examiner* — Manish S Shah
(74) *Attorney, Agent, or Firm* — Banner & Witcoff, Ltd.

(57) ABSTRACT

A water-based ink for ink-jet recording includes a colorant, water, a surfactant, and a compound represented by the following formula (1).

$$\begin{array}{c} CH_2R \\ | \\ CHOH \\ | \\ CH_2OH \end{array} \quad (1)$$

In the formula (1), R is an alkyl ether group or an alkyl ester group in which a number of carbon atoms of a main chain is not less than 6, and each of an alkyl group of the alkyl ether group and an alkyl group of the alkyl ester group is in a straight chain form or a branched chain form.

25 Claims, 1 Drawing Sheet

(51) Int. Cl.
*B41J 2/21* (2006.01)
*C09D 11/322* (2014.01)

(58) Field of Classification Search
CPC ... C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................................................. 347/95–105
See application file for complete search history.

(56) References Cited

U.S. PATENT DOCUMENTS

| | | | |
|---|---|---|---|
| 7,819,962 B2 | 10/2010 | Gu | |
| 7,922,805 B2 | 4/2011 | Kowalski et al. | |
| 8,016,404 B2 | 9/2011 | Kato et al. | |
| 2003/0097960 A1* | 5/2003 | Ito | C09D 11/30 106/31.58 |
| 2005/0117008 A1* | 6/2005 | Konishi | C09D 11/40 347/100 |
| 2006/0201380 A1 | 9/2006 | Kowalski et al. | |
| 2006/0210500 A1 | 9/2006 | Bicard-Benhamou et al. | |
| 2006/0246149 A1 | 11/2006 | Buchholz et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |
| 2009/0233059 A1 | 9/2009 | Ota et al. | |
| 2011/0048278 A1* | 3/2011 | Kiyomoto | C09D 11/322 106/31.86 |

FOREIGN PATENT DOCUMENTS

| | | |
|---|---|---|
| EP | 2474580 A1 | 7/2012 |
| JP | H08-003498 A | 1/1996 |
| JP | 2000-513396 A | 10/2000 |
| JP | 2004-231711 A | 8/2004 |
| JP | 2006-523735 A | 10/2006 |
| JP | 2007-197675 A | 8/2007 |
| JP | 2008-524400 A | 7/2008 |
| JP | 2008-246821 A | 10/2008 |
| JP | 2009-515007 A | 4/2009 |
| JP | 2011-515535 A | 5/2011 |

* cited by examiner

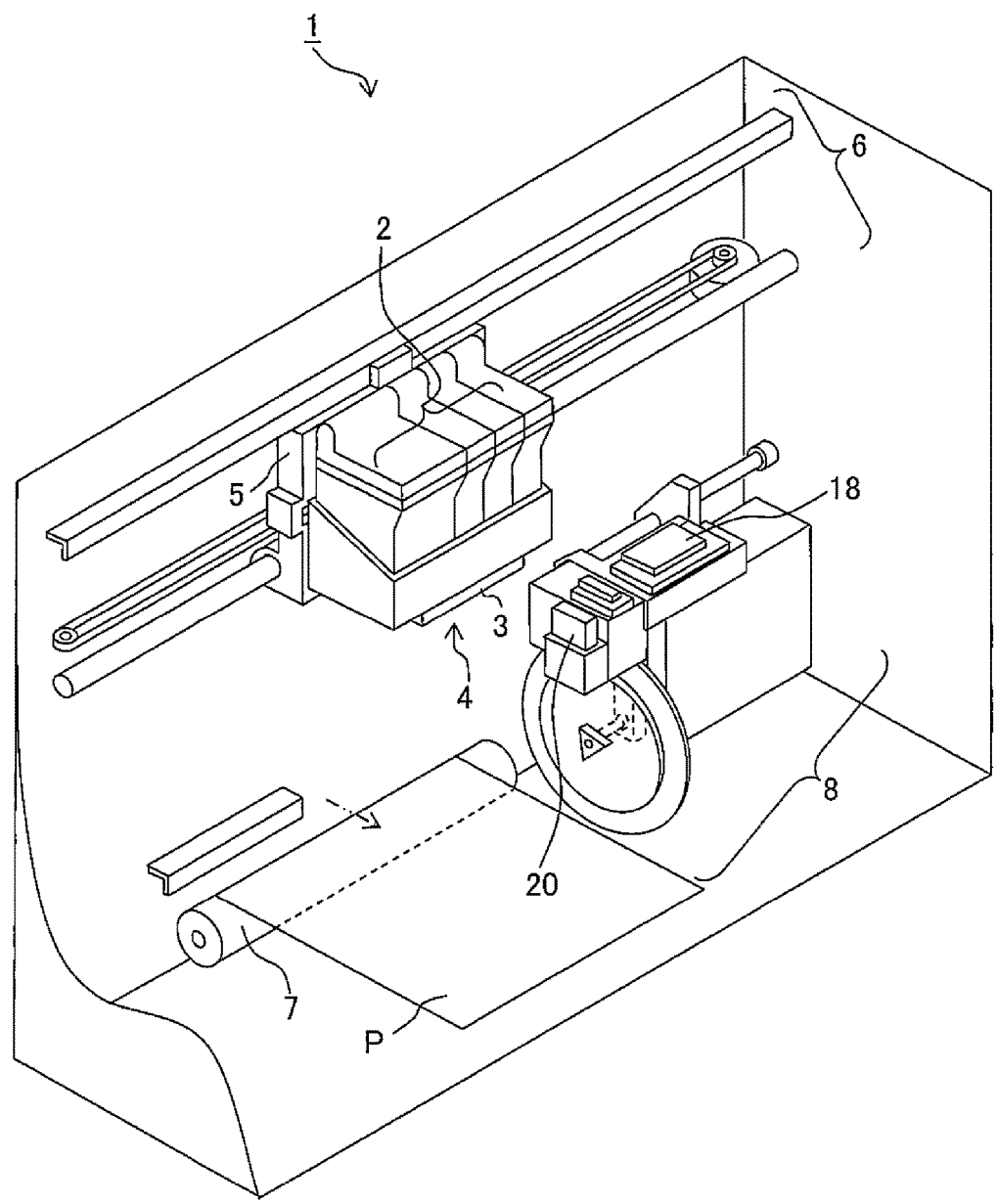

WATER-BASED INK FOR INK-JET RECORDING AND INK CARTRIDGE

CROSS REFERENCE TO RELATED APPLICATION

The present application claims priority from Japanese Patent Application No. 2014-199316, filed on Sep. 29, 2014, the disclosure of which is incorporated herein by reference in its entirety.

BACKGROUND OF THE INVENTION

Field of the Invention

The present invention relates to a water-based ink for ink-jet recording and an ink cartridge.

Description of the Related Art

A technique, in which the colorant concentration is raised, is known as a technique for improving the optical density (OD value) of recorded matter based on the use of a water-based ink (see, for example, Japanese Patent Application Laid-open No. 2004-231711).

However, if the colorant concentration is raised, problems arise such that the cost is increased and the stability of the water-based ink is degraded.

SUMMARY OF THE INVENTION

In view of the above, an object of the present teaching is to provide a water-based ink for ink-jet recording which makes it possible to improve the optical density (OD value) of recorded matter based on the use of a water-based ink even when the colorant concentration is not raised.

According to a first aspect of the present teaching, there is provided a water-based ink for ink-jet recording including a colorant, water, a surfactant, and a compound represented by the following formula (1).

(1)

In the formula (1), R is an alkyl ether group or an alkyl ester group in which a number of carbon atoms of a main chain is not less than 6, and each of an alkyl group of the alkyl ether group and an alkyl group of the alkyl ester group is in a straight chain form or a branched chain form.

According to a second aspect of the present teaching, there is provided an ink cartridge which includes the water-based ink for ink-jet recording according to the first aspect.

BRIEF DESCRIPTION OF THE DRAWING

FIG. 1 shows a schematic perspective view illustrating an exemplary arrangement of an ink-jet recording apparatus according to the present teaching.

DESCRIPTION OF THE PREFERRED EMBODIMENTS

An explanation will be made about the water-based ink for ink-jet recording of the present teaching (hereinafter referred to as "water-based ink" or "ink" in some cases). The water-based ink of the present teaching includes a colorant and water.

The colorant is not specifically limited, which may be either a pigment or a dye.

The pigment is not specifically limited, which is exemplified, for example, by carbon black, inorganic pigment, and organic pigment. The carbon black is exemplified, for example, by furnace black, lamp black, acetylene black, and channel black. The inorganic pigment can be exemplified, for example, by titanium oxide, iron oxide-based inorganic pigment, and carbon black-based inorganic pigment. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Other pigments are also usable provided that the pigments are dispersible in the water phase. Specified examples of the pigments are exemplified, for example, by C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may be a self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, and phosphoric acid group is introduced into the pigment particles by the chemical bond directly or with any other group intervening therebetween. Those usable as the self-dispersible pigment include, for example, those in which the pigment is treated or processed in accordance with any method described, for example, in U.S. Pat. No. 5,609,671, U.S. Pat. No. 5,837,045, United States Patent Application Publication No. 2006/0201380, United States Patent Application Publication Nos. 2007/0100023 and 2007/0100024, and United States Patent Application Publication No. 2009/0229489. As for the raw material for the self-dispersible pigment, it is possible to use any one of inorganic pigments and organic pigments. The pigment, which is suitable to perform the treatment as described above, includes, for example, carbon blacks such as "MA8" and "MA100" produced by Mitsubishi Chemical Corporation. For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink SC Holdings Co., Ltd.

The solid content blending amount of the pigment (pigment solid content amount) with respect to the total amount of the water-based ink is not specifically limited, which can be appropriately determined, for example, on the basis of the desired optical density. The pigment solid content is, for example, 0.1% by weight to 20% by weight, preferably 1% by weight to 10% by weight, more preferably 2% by weight to 8% by weight, and much more preferably 2% by weight to 6% by weight. The water-based ink makes it possible to improve the optical density (OD value) of the recorded matter based on the use of the water-based ink without raising the colorant concentration. Therefore, for example, even when the pigment concentration is relatively low, i.e., 2% by weight to 6% by weight, it is possible to obtain a sufficient optical density (OD value).

The dye is not specifically limited, which is exemplified, for example, by direct dyes, acid dyes, basic dyes, and reactive dyes. Specified examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 90, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I. Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2.

The blending amount of the dye with respect to the total amount of the water-based ink is not specifically limited, which is, for example, 0.1% by weight to 20% by weight, and preferably 0.3% by weight to 10% by weight.

One type of the colorant may be used singly. Alternatively, two or more types of the colorants may be used in combination. The colorant is preferably the pigment and more preferably the self-dispersible pigment, in view of the improvement in the optical density (OD value). Further, the colorant may be composed of only the pigment and more preferably only the self-dispersible pigment.

It is preferable that the water is ion exchange water or pure water. The blending amount of water (water ratio) with respect to the total amount of the water-based ink is appropriately determined depending on, for example, any desired ink characteristic. The water ratio may be, for example, the balance of the other components.

The water-based ink of the present teaching further includes "A" (compound represented by the formula (1)) and "B" (surfactant) shown below.

A: compound represented by the formula (1)
B: surfactant

In the formula (1), R is an alkyl ether group or an alkyl ester group in which a number of carbon atoms of a main chain is not less than 6, and alkyl groups of the alkyl ether group and the alkyl ester group may be either in a straight chain form or a branched chain form.

It is preferable that the "A" includes at least one of a compound (ethyl hexyl glycerol) represented by the following formula (1a) and a compound (glyceryl caprylate) represented by the following formula (1b):

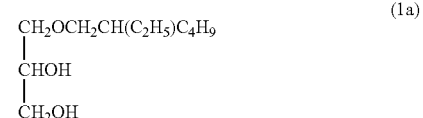

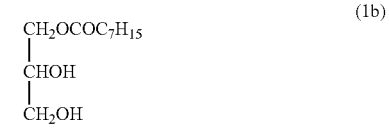

Further, it is preferable that the "A" is a mixture of the compound (ethyl hexyl glycerol) represented by the formula (1a) and the compound (glyceryl caprylate) represented by the formula (1b), or the compound represented by the formula (1a). When the "A" is the mixture of the compound represented by the formula (1a) and the compound represented by the formula (1b), a weight ratio (1a)/(1b) of a blending amount of the compound represented by the formula (1a) to a blending amount of the compound represented by the formula (1b) is not specifically limited. However, for example, (1a)/(1b)=0.25 to 4 is given, and preferably (1a)/(1b)=0.5 to 2 is given.

The "A" may be prepared privately or independently, or any commercially available product may be used therefor. The commercially available product is exemplified, for example, by "NIKKOL (trade name) Nikkoguard (trade name) 88" produced by Nikko Chemicals Co., Ltd., "Lexgard (trade name) E" produced by Lexgard (trade name) Laminates, and "MinaCare Hexcine" produced by Minasolve.

The blending amount of the "A" (A ratio) with respect to the total amount of the water-based ink is, for example, not more than 5% by weight, preferably not more than 2% by weight, and more preferably not more than 0.5% by weight. When the A ratio is not more than 0.5% by weight, it is possible to obtain the water-based ink which is more excellent in the vaporization characteristic. Further, the lower limit value of the A ratio is not specifically limited. However, the lower limit value of the A ratio is preferably not less than 0.05% by weight.

As described above, the water-based ink of the present teaching makes it possible to improve the optical density (OD value) of the recorded matter based on the use of the water-based ink by blending the "A" even when the colorant concentration is not raised. Further, it is also possible to apply the fungus resistance (antifungal performance). The mechanism, by which the optical density (OD value) is improved by blending the "A", is estimated, for example, as follows. That is, it is estimated that the "A" tends to remain on the recording medium surface together with the colorant, because the "A" is hardly dissolved in water, and thus the optical density (OD value) is consequently improved. However, the mechanism described above is merely estimated, and the present teaching is not limited thereto.

It is preferable that a weight ratio (A/C) of a blending amount (A) of the compound represented by the formula (1) to a blending amount (C) of the colorant is preferably 0.01 to 1.0, and more preferably 0.025 to 0.25. When the weight ratio (A/C) is within this range, it is thereby possible to sufficiently improve the optical density (OD value) of the recorded matter based on the use of the water-based ink.

The "B" functions, for example, to raise the solubility of the "A" in water. The "B" is not specifically limited. However, the "B" is preferably anionic surfactant and/or nonionic surfactant. the "B" is exemplified, for example, by anionic surfactants produced by Kao Corporation including "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series; anionic surfactants produced by Lion Corporation including "LIPOLAN (trade name)" series, "LIPON (trade name)" series, "SUNNOL (trade name)" series, "LIPOTAC (trade name) TE, ENAGICOL" series, "LIPAL (trade name)" series, and "LOTAT (trade name)" series; nonionic surfactants produced by Kao Corporation including "EMULGEN (trade name)" series, "RHEODOL (trade name)" series, "EMASOL (trade name)" series, "EXCEL (trade name)" series, "EMANON (trade name)" series, "AMIET (trade name)" series, and "AMINON (trade name)" series; nonionic surfactants produced by Toho Chemical Industry Co., Ltd. including "SOLVON (trade name)" series; nonionic surfactants produced by Lion Corporation including "DOBANOX (trade name)" series, "LEOCOL (trade name)" series, "LEOX (trade name)" series, "LAOL, LEOCON (trade name)" series, "LIONOL (trade name)" series, "CADENAX (trade name)" series, "LIONON (trade name)" series, and "LEOFAT (trade name)" series; and cationic surfactants produced by Dai-ichi Kogyo Seiyaku Co. Ltd. including "CATIOGEN (trade name) ES-OW" and "CATIOGEN (trade name) ES-L". Among them, it is more preferable to use the anionic surfactants.

The nonionic surfactant may be an acetylene glycol-based nonionic surfactant, or a nonionic surfactant having ethylene oxide group(s) (EO group-containing nonionic surfactant). It is preferred that the EO group-containing nonionic surfactant be an acetylene glycol-based nonionic surfactant represented by following formula (2). The acetylene glycol-based nonionic surfactant represented by the formula (2) is especially likely to spread on a recording sheet in a lateral direction (the direction along a recording surface of the recording sheet) as compared with other nonionic surfactants. Thus, using the acetylene glycol-based nonionic surfactant represented by the formula (2) results in the water-based ink having a better quick-drying property and higher optical density (OD value).

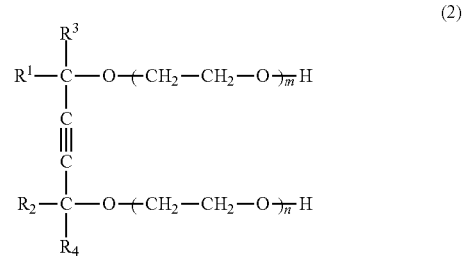

(2)

In the formula (2), m and n may be same or different from each other, and m and n are integers satisfying m+n=1 to 15, preferably integers satisfying m+n=3 to 11, and more preferably integers satisfying m+n=4 to 10. In the formula (2), each of R1, R2, R3, and R4 is a straight or branched chain alkyl group having 1 to 5 carbon atoms, and R1, R2, R3, and R4 may be same or different from one another. R1, R2, R3 and R4 are exemplified, for example, by methyl group, ethyl group, propyl group, isopropyl group, butyl group and isobutyl group. Each of R1, R2, R3 and R4 is preferably methyl group or isopropyl group.

Any commercially available product may be used for the EO group-containing nonionic surfactant. Among the commercially available products, the acetylene glycol-based nonionic surfactant is exemplified, for example, by "OLFIN (trade name) E1004" (acethylene glycol EO adduct, m or n=2, m+n=4), "OLFIN (trade name) E1008" (acethylene glycol EO adduct, m or n=4, m+n=8), and "OLFIN (trade name) E1010" (acethylene glycol EO adduct, m or n=5, m+n=10) produced by Nissin Chemical Co., Ltd.

The anionic surfactant may be a anionic surfactant having ethylene oxide group(s) (EO group-containing anionic surfactant). The EO group-containing anionic surfactant is exemplified, for example, by a carboxylic acid type having carboxylic acid salt, a sulfuric acid ester type having a sulfuric acid ester structure, and a phosphoric acid ester type having a phosphoric acid ester structure. The carboxylic acid type having ether carboxylic acid salt is preferably used. The sulfuric acid ester type having ether sulfuric acid ester salt is preferably used. Any commercially available product may be used for the EO group-containing anionic surfactant. The commercially available product, which contains the ether carboxylic acid salt, includes, for example, "KAO AKYPO RLM-45NV" (Sodium polyoxyethylene lauryl ether acetate), "KAO AKYPO RLM-100NV" (Sodium polyoxyethylene(10) lauryl ether acetate), "ENAGICOL (trade name) EC-30" (Sodium polyoxyethylene lauryl ether acetate), and "NIKKOL AKYPO RLM 100 NV" (Aqueous solution of sodium polyoxyethylene(10) lauryl ether acetate) produced by KAO CORPORATION. The commercially available product, which contains the ether sulfuric acid ester salt, includes, for example, "EMAL (trade name) 20C" (Sodium polyoxyethylene(3) lauryl ether sulfate), "EMAL (trade name) E-27C" (Sodium polyoxyethylene lauryl ether sulfate), and "LATEMUL-E150" (Sodium polyoxyethylene lauryl ether sulfate) produced by KAO CORPORATION; "SUNNOL (trade name) NL1430" (Sodium polyoxyethylene alkyl ether sulfate) produced by Lion Corporation; and "SANDET (trade name) ET" (Polyoxyethylene lauryl ether sulfuric acid ester) produced by Sanyo Chemical Industries, Ltd. The phosphoric acid ester type is exemplified, for example, by polyoxyethylene-alkyl ether-phosphoric acid salt and polyoxyethylene-alkylphenyl ether-phosphoric acid salt.

As for the "B", one type may be used singly, or two or more types may be used in combination. For example, as for the "B", the anionic surfactant and the nonionic surfactant may be used in combination. Both of the anionic surfactant and the nonionic surfactant to be used in combination may have ethylene oxide groups. It is preferable that the anionic surfactant have ether carboxylic acid salt or ether sulfuric acid ester salt, and that the nonionic surfactant be the acetylene glycol-based nonionic surfactant. The acetylene glycol-based nonionic surfactant is more preferably the surfactant represented by the formula (2).

The blending amount of the "B" with respect to the total amount of the water-based ink is, for example, 0.1% by weight to 10% by weight, preferably 0.1% by weight to 8% by weight, and more preferably 0.1% by weight to 5% by weight.

The weight ratio between the "A" and the "B" is, for example, A:B=1:2 to 1:20 and preferably 1:5 to 1:20. That is, the weight ratio (B/A) of the blending amount (B) of the surfactant to the blending amount (A) of the compound represented by the formula (1) is preferably 2 to 20 and more preferably 5 to 20. When A:B=1:5 to 1:20 is given, i.e., when the weight ratio (B/A) is 5 to 20, then it is thereby possible to obtain the water-based ink which is more excellent in the discharge performance.

It is preferable that the water-based ink further contains a water-soluble organic solvent. The water-soluble organic solvent is exemplified, for example, by a humectant (a moistening agent) which prevents the water-based ink from being dried at the nozzle forward end portions of the ink-jet head and a penetrant (a permeating agent) which adjusts the drying speed on the recording medium.

The humectant described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyhydric alcohols such as alkylene glycols, glycerol, trimethylolpropane, and trimethylolethane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. Among them, it is preferable to use polyhydric alcohol such as alkylene glycol and glycerol.

The blending amount of the humectant with respect to the total amount of the water-based ink is, for example, 0% by weight to 95% by weight, preferably 5% by weight to 80% by weight, and more preferably 5% by weight to 50% by weight.

When the water-based ink contains glycerol, the blending amount of glycerol with respect to the total amount of the water-based ink is, for example, 2% by weight to 10% by weight and preferably 20% by weight to 22% by weight. In the water-based ink, the weight ratio (G/C) of the blending amount (G) of glycerol with respect to the blending amount (C) of the colorant is, for example, preferably 5.0 to 5.4. When the weight ratio (G/C) is within this range, it is thereby possible to efficiently prevent the water-based ink from being dried at the nozzle forward end portions of the ink-jet head.

The penetrant includes, for example, glycol ether. Glycol ether includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount of the penetrant with respect to the total amount of the water-based ink is, for example, 0% by weight to 20% by weight, preferably 0% by weight to 15% by weight, and more preferably 1% by weight to 4% by weight.

The water-based ink may further contain conventionally known additives, if necessary. The additive includes, for example, pH-adjusting agents, viscosity-adjusting agents, surface tension-adjusting agents, and fungicides. The viscosity-adjusting agent includes, for example, polyvinyl alcohol, cellulose, and water-soluble resin.

As explained above, the water-based ink for ink-jet recording of the present teaching makes it possible to improve the optical density (OD value) of the recorded matter based on the use of the water-based ink without raising the colorant concentration by blending the compound represented by the formula (1) described above. Further, it is also possible to apply the fungus resistance (antifungal performance).

In the next place, the ink cartridge of the present teaching is the ink cartridge which contains the water-based ink for ink-jet recording, wherein the water-based ink is the water-based ink for ink-jet recording of the present teaching. For example, a conventionally known main body can be used as the main body of the ink cartridge.

In the next place, an explanation will be made about an ink-jet recording apparatus and an ink-jet recording method according to the present teaching.

The ink-jet recording apparatus of the present teaching resides in an ink-jet recording apparatus including an ink accommodating unit and ink discharge mechanism, for discharging the ink accommodated in the ink accommodating unit by the ink discharge mechanism, wherein the water-based ink for ink-jet recording of the present teaching is accommodated in the ink accommodating unit.

The ink-jet recording method of the present teaching resides in an ink-jet recording method for performing recording by discharging a water-based ink onto a recording medium in accordance with an ink-jet system, wherein the water-based ink for ink-jet recording of the present teaching is used as the water-based ink.

The ink-jet recording method of the present teaching can be carried out by using, for example, the ink-jet recording apparatus of the present teaching. The recording includes, for example, the letter printing, the image printing, and the print or printing.

FIG. 1 shows an exemplary arrangement of the ink-jet recording apparatus of the present teaching. As shown in the drawing, the ink-jet recording apparatus 1 includes, as main constitutive elements, four ink cartridges 2, ink discharge mechanism (ink-jet head) 3, a head unit 4, a carriage 5, a driving unit 6, a platen roller 7, and a purge device 8.

Each of the four ink cartridges 2 includes each of the four color water-based inks of yellow, magenta, cyan, and black one by one. At least one of the four color water-based inks described above is the water-based ink for ink-jet recording of the present teaching. The ink-jet head 3, which is installed on the head unit 4, performs the recording on a recording medium (for example, recording paper) P. The four ink cartridges 2 and the head unit 4 are carried on the carriage 5. The driving unit 6 reciprocatively moves the carriage 5 in the linear direction. For example, any conventionally known driving unit (see, for example, United States Patent Application Publication No. 2008/0241398) can be used as the driving unit 6. The platen roller 7 extends in the reciprocating direction of the carriage 5, and the platen roller 7 is arranged opposingly to the ink-jet head 3.

The purge device 8 sucks any defective ink containing the bubble or the like staying at the inside of the ink-jet head 3. For example, any conventionally known purge device (see, for example, United States Patent Application Publication No. 2008/0241398) can be used as the purge device 8.

A wiper member 20 is arranged adjacently to the purge device 8 on the platen roller 7 side of the purge device 8. The wiper member 20 is formed to have a spatula-shaped form. The wiper member 20 wipes out the nozzle-formed surface of the ink-jet head 3 in accordance with the movement of the carriage 5. With reference to FIG. 1, the cap 18 covers a plurality of nozzles of the ink-jet head 3 which is returned to the reset position when the recording is completed in order to prevent the water-based inks from being dried.

In the ink-jet recording apparatus 1 of this embodiment, the four ink cartridges 2 are carried on one carriage 5 together with the head unit 4. However, the present teaching is not limited thereto. In the ink-jet recording apparatus 1, the respective cartridges of the four ink cartridges 2 may be carried on any carriage distinctly from the head unit 4. Further, the respective cartridges of the four ink cartridges 2 may be arranged and fixed in the ink-jet recording apparatus 1 without being carried on the carriage 5. In the modes as described above, for example, the respective cartridges of the four ink cartridges 2 are connected to the head unit 4 carried on the carriage 5 by tubes or the like, and the water-based inks are supplied from the respective cartridges of the four ink cartridges 2 to the head unit 4.

The ink-jet recording, which is based on the use of the ink-jet recording apparatus 1, is carried out, for example, as follows. At first, the recording paper P is fed from a paper feed cassette (not shown) provided on the side portion or the lower portion of the ink-jet recording apparatus 1. The recording paper P is introduced into the space between the ink-jet head 3 and the platen roller 7. Predetermined recording is performed on the introduced recording paper P with the water-based inks discharged from the ink-jet head 3. After the recording, the recording paper P is discharged from the ink-jet recording apparatus 1. The recorded matter, which is subjected to the recording with the water-based ink of the present teaching, has a high optical density (OD value). A paper feed mechanism and a paper discharge mechanism for the recording paper P are omitted from the illustration in FIG. 1.

FIG. 1 shows the apparatus which adopts the serial type ink-jet head. However, the present teaching is not limited thereto. The ink-jet recording apparatus described above may be an apparatus which adopts a line type ink-jet head.

EXAMPLES

Next, Examples of the present teaching will be explained together with Comparative Examples. It is noted that the present teaching is not limited and restricted to Examples and Comparative Examples described below.

Examples 1-1 to 1-7 and Comparative Examples 1-1 to 1-4

Ink solvents were obtained by uniformly mixing components except for the pigment contained in water-based ink compositions (Table 1). Subsequently, the ink solvents were added to the pigment dispersed in water, followed by being uniformly mixed. After that, obtained mixtures were filtrated through a cellulose acetate type membrane filter produced by Toyo Roshi Kaisha, Ltd. (pore size: 3.00 µm), and thus water-based inks for ink-jet recording of Examples 1-1 to 1-7 and Comparative Examples 1-1 to 1-4 were obtained.

In relation to the water-based inks of Examples 1-1 to 1-7 and Comparative Examples 1-1 to 1-4, (a) the evaluation of the optical density (OD value), (b) the evaluation of the discharge performance, (c) the evaluation of the solubility of the "A" (compound represented by the formula (1)), (d) the evaluation of the vaporization characteristic, and (e) the evaluation of the fungus resistance (antifungal performance) were carried out in accordance with the following methods.

(a) Evaluation of Optical Density (OD Value)

An ink-jet printer MFC-J4510N produced by Brother Industries, Ltd. was used to record an image including a black single color patch on regular paper under a condition in which the resolution was 600 dpi×300 dpi, Duty was 100%, and the liquid droplet amount was 35 pL, by using each of the water-based inks of Examples 1-1 to 1-7 and Comparative Examples 1-1 to 1-4, and thus an evaluation sample was prepared. Optical densities (OD values) were measured at three positions of the evaluation sample by using a spectrophotometer, SpectroEye produced by X-Rite (light source: $D_{50}$, angle of field: 2°, ANSI-T), and an average value was acquired. "XEROX 4200" produced by XEROX was used for the regular paper.

(b) Evaluation of Discharge Performance

A recording test was performed immediately after performing the purge (suction of the water-based ink by a pump of a main body of the ink-jet printer MFC-J4510N described above) three times after the exchange of the ink cartridge by using each of the water-based inks of Examples 1-1 to 1-7 and Comparative Examples 1-1 to 1-4 by using the ink-jet printer MFC-J4510N described above. The ratio of discharge nozzles to the total number of nozzles was acquired, and the evaluation was performed in accordance with the following evaluation criteria.

<Evaluation Criteria for Discharge Performance Evaluation>

A: ratio of discharge nozzles to total number of nozzles was 100% (all nozzles were able to perform discharge);

B: ratio of discharge nozzles to total number of nozzles was not less than 90% and less than 100%;

C: ratio of discharge nozzles to total number of nozzles was less than 90%.

(c) Evaluation of Solubility of the "A" (Compound Represented by Formula (1))

The ink solvent, in which the components except for the pigment to be contained in the water-based ink composition (Table 1) were uniformly mixed, was observed visually, and the evaluation was performed in accordance with the following evaluation criteria.

<Evaluation Criteria for Solubility Evaluation for the "A" (Compound Represented by Formula (1))>

A: uniform or homogeneous solvent was obtained without any residue of dissolution;

Not dissolved: oil floating and/or precipitation was/were observed.

(d) Evaluation of Vaporization Characteristic 5 g of each of the water-based inks of Examples 1-1 to 1-7 and Comparative Examples 1-1 to 1-4 was poured into an open bottle (vial) (diameter: 20.2 mm). Subsequently, the open bottle was stored overnight in a thermostatic chamber (oven) at a temperature of 60° C. and a relative humidity of 40%. After the storage, the state of the water-based ink in the open bottle was observed visually, and the vaporization characteristic was evaluated in accordance with the following evaluation criteria.

<Evaluation Criteria for Evaluation of Vaporization Characteristic>

A: fluidity approximately equivalent to that of water-based ink before storage was obtained;

B: viscosity was somewhat raised as compared with water-based ink before storage.

(e) Evaluation of Fungus Resistance (Antifungal Performance)

The water-based ink of each of Examples 1-1 to 1-7 was left to stand at ordinary temperature for 4 weeks in an open system, and then the water-based ink was applied to Food Stamp Standard Method Agar (produced by NISSUI PHARMACEUTICAL CO., LTD.), followed by being stored for 3 days in an environment of temperature of 35° C. After that, it was visually confirmed whether or not any colony of fungus appeared on Standard Method Agar, and the fungus resistance was evaluated in accordance with the following evaluation criteria.

<Evaluation Criteria for Fungus Resistance Evaluation>

G: colony did not appeared;

NG: colony appeared.

The water-based ink compositions and the evaluation results are shown in Table 1 for the water-based inks of Examples 1-1 to 1-7 and Comparative Examples 1-1 to 1-4.

TABLE 1

| | | | Examples | | | | | | |
|---|---|---|---|---|---|---|---|---|---|
| | | | 1-1 | 1-2 | 1-3 | 1-4 | 1-5 | 1-6 | 1-7 |
| Water-based ink composition (% by weight) | Pigment | CAB-O-JET (trade name) 300 (*1) | 26.27 (4.00) | 26.67 (4.00) | 26.67 (4.00) | 26.67 (4.00) | 26.67 (4.00) | 26.67 (4.00) | 26.67 (4.00) |
| | humectant | 85% Glycerol | 25.00 | 25.00 | 25.00 | 24.00 | 24.00 | 25.00 | 24.00 |
| | | Diglycerol | — | — | — | — | — | — | — |
| | penetrant | Triethylene glycol n-butyl ether | — | — | 1.00 | — | — | — | — |
| | | Dipropylene glycol n-propyl ether | 1.00 | — | — | 1.00 | 1.00 | 1.00 | 1.00 |
| B | Surfactant | SUNNOL (trade name) NL1430 (*2) | 1.00 | 1.00 | 1.00 | 3.00 | — | 2.00 | 5.00 |
| | | NEOPELEX (trade name) G15 (*3) | — | — | — | — | 4.00 | — | — |
| | | OLFINE (trade name) E1010 (*4) | 0.20 | 1.00 | 0.20 | 0.20 | 0.20 | 0.20 | 0.20 |
| | Fungicide | Proxel GXL(s) (*5) | — | — | — | — | — | — | — |
| A | Compound represented by formula (1) | NIKKOL (trade name) Nikkoguard (trade name) 88 (*6) | 0.10 | — | — | — | 0.50 | 0.50 | 1.00 |
| | | Lexgard (trade name) E (*7) | — | 0.10 | — | 0.50 | — | — | — |
| | | MinaCare Hexcine (*8) | — | — | 0.10 | — | — | — | — |
| | | Water | balance | balance | balance | balance | balance | balance | balance |
| | B/A | | 12 | 20 | 12 | 6.4 | 8.4 | 4.4 | 5.2 |
| Evaluation | | Optical density (OD value) | 0.99 | 0.97 | 1.02 | 1.05 | 1.03 | 1.06 | 1.11 |
| | | Discharge performance | A | A | A | A | A | B | A |
| | | Solubility of "A" | A | A | A | A | A | A | A |
| | | Vaporization characteristic | A | A | A | A | A | A | B |
| | | Fungus resistance | G | G | G | G | G | G | G |

| | | | Comparative Examples | | | |
|---|---|---|---|---|---|---|
| | | | 1-1 | 1-2 | 1-3 | 1-4 |
| Water-based ink composition (% by weight) | Pigment | CAB-O-JET (trade name) 300 (*1) | 26.27 (4.00) | 26.67 (4.00) | 26.67 (4.00) | 26.67 (4.00) |
| | humectant | 85% Glycerol | 25.00 | 20.00 | 25.00 | 25.00 |
| | | Diglycerol | — | 2.00 | — | — |
| | penetrant | Triethylene glycol n-butyl ether | — | — | — | — |
| | | Dipropylene glycol n-propyl ether | 1.00 | 1.00 | 1.00 | 1.00 |
| B | Surfactant | SUNNOL (trade name) NL1430 (*2) | 1.00 | 1.00 | — | 1.00 |
| | | NEOPELEX (trade name) G15 (*3) | — | — | — | — |
| | | OLFINE (trade name) E1010 (*4) | 0.20 | 0.20 | — | 1.00 |
| | Fungicide | Proxel GXL(s) (*5) | 0.05 | 0.05 | — | — |
| A | Compound represented by | NIKKOL (trade name) Nikkoguard (trade name) 88 (*6) | — | — | 0.10 | — |

TABLE 1-continued

| | formula (1) | Lexgard (trade name) E (*7) | — | — | — | — |
|---|---|---|---|---|---|---|
| | | MinaCare Hexcine (*8) | — | — | — | — |
| | | Water | balance | balance | balance | balance |
| | B/A | | — | — | 0 | — |
| Evaluation | | Optical density (OD value) | 0.92 | 0.92 | not dis-solved | 0.90 |
| | | Discharge performance | A | A | | A |
| | | Solubility of "A" | A | A | | A |
| | | Vaporization characteristic | A | A | | A |
| | | Fungus resistance | G | G | | NG |

TABLE 1 - LEGEND
*1: Produced by Cabot Specialty Chemicals; parenthesized numerals indicate pigment solid content amounts
*2: Anionic surfactant; sodium polyoxyethylene alkyl (C = 12, 13) ether sulfate; produced by Lion Corporation; active ingredient = 28%
*3: Anionic surfactant; sodium dodecylbenzenesulfonate; produced by Kao Corporation; active ingredient = 16%
*4: Acetylene glycol-based nonionic surfactant (ethylene oxide (10 mol) adduct of diol); produced by Nissin Chemical Industry Co., Ltd.; active ingredient = 100%
*5: Produced by Arch Chemicals
*6: Mixture of ethyl hexyl glycerol and glyceryl caprylate; produced by Nikko Chemicals Co., Ltd.; active ingredient = 100%
*7: Ethyl hexyl glycerol; produced by Lexgard (trade name) Laminates; active ingredient = 100%
*8: Ethyl hexyl glycerol; produced by Minasolve, active ingredient =100%

As shown in Table 1, the optical density (OD value) was improved in Examples 1-1 to 1-7 as compared with Comparative Examples 1-1, 1-2, and 1-4 in which the "A" was not blended in the water-based ink. In Examples 1-1 to 1-7, the discharge performance, the solubility, and the vaporization characteristic were also excellent. The optical density was higher in Examples 1-4 to 1-6 in which the blending amount of the "A" was 0.50% by weight as compared with Examples 1-1 to 1-3 in which the blending amount of the "A" was 0.10% by weight. Then, the optical density was the highest in Example 1-7 in which the blending amount of the "A" was the highest, i.e., 1.00% by weight among Examples 1-1 to 1-7. According to the results described above, it is speculated that the higher the blending amount of the "A" is, the more improved the optical density is. Further, the discharge performance was especially excellent in Examples 1-1 to 1-5 and 1-7 in which the weight ratio between the "A" and the "B" was A:B=1:5 to 1:20, namely B/A=5 to 20. Then, the vaporization characteristic was especially excellent in Examples 1-1 to 1-6 in which the blending amount of the "A" with respect to the total amount of the water-based ink was not more than 0.5% by weight. Further, the fungus resistance (antifungal performance) was excellent in Examples 1-1 to 1-7 in which the "A" was blended, although any fungicide was not blended.

On the other hand, in the case of Comparative Examples 1-1, 1-2, and 1-4 in which the "A" was not blended in the water-based ink, the discharge performance, the solubility, and the vaporization characteristic were excellent, but the optical density (OD value) was low as compared with Examples 1-1 to 1-7. Further, in the case of Comparative Example 1-3 in which any surfactant was not blended in the water-based ink, the "A" was not dissolved, and any water-based ink was unable to be prepared.

Example 2-1 and Comparative Example 2-1

Ink solvents were obtained by uniformly mixing components except for the pigment to be contained in ink compositions (Table 2). Subsequently, the ink solvents were added to the pigment dispersed in water, followed by being uniformly mixed. After that, obtained mixtures were filtrated through a cellulose acetate type membrane filter produced by Toyo Roshi Kaisha, Ltd. (pore size: 3.00 μm), and thus water-based inks for ink-jet recording of Example 2-1 and Comparative Example 2-1 were obtained.

In relation to the water-based inks of Example 2-1 and Comparative Example 2-1, (a) the evaluation of the optical density (OD value), (b) the evaluation of the discharge performance, (c) the evaluation of the solubility of the "A" (compound represented by the formula (1)), (d) the evaluation of the vaporization characteristic, and (e) the evaluation of the fungus resistance (antifungal performance) were carried out in the same manner as in Examples 1-1 to 1-7 and Comparative Examples 1-1 to 1-4 except that an image including a cyan single color patch was recorded to prepare an evaluation sample in (a) the evaluation of the optical density (OD value).

Table 2 shows the ink compositions and the evaluation results of the water-based inks of Example 2-1 and Comparative Example 2-1.

TABLE 2

| | | | | Example 2-1 | Comp. Ex. 2-1 |
|---|---|---|---|---|---|
| Ink composition (% by weight) | | Pigment | CAB-O-JET (trade name) 250C (*9) | 26.67 (4.00) | 26.67 (4.00) |
| | | humectant | 85% Glycerol | 25.00 | 25.00 |
| | | penetrant | Dipropylene glycol n-propyl ether | 1.00 | 1.00 |
| | B | Surfactant | SUNNOL (trade name) NL1430 (*2) | 1.00 | 1.00 |
| | | | OLFINE (trade name) E1010 (*4) | 0.20 | 0.20 |
| | | Fungicide | Proxel GXL(s) (*5) | — | 0.05 |
| | A | Compound represented by formula (1) | NIKKOL (trade name) Nikkoguard (trade name) 88 (*6) | 0.10 | — |
| | | | Water | balance | balance |
| | B/A | | | 12 | — |
| Evaluation | | | Optical density (OD value) | 0.86 | 0.79 |
| | | | Discharge performance | A | A |

TABLE 2-continued

|  | Example 2-1 | Comp. Ex. 2-1 |
|---|---|---|
| Solubility of "A" | A | A |
| Vaporization characteristic | A | A |
| Fungus resistance | G | G |

TABLE 2 - LEGEND
*2: Anionic surfactant; sodium polyoxyethylene alkyl (C = 12, 13) ether sulfate; produced by Lion Corporation; active ingredient = 28%
*3: Anionic surfactant; sodium dodecylbenzenesulfonate; produced by Kao Corporation; active ingredient = 16%
*4: Acetylene glycol-based nonionic surfactant (ethylene oxide (10 mol) adduct of diol); produced by Nissin Chemical Industry Co., Ltd.; active ingredient = 100%
*5: Produced by Arch Chemicals
*6: Mixture of ethyl hexyl glycerol and glyceryl caprylate; produced by Nikko Chemicals Co., Ltd.; active ingredient = 100%
*9: Produced by Cabot Specialty Chemicals; parenthesized numerals indicate pigment solid content amounts As shown in Table 2, the optical density (OD value) was improved in Example 2-1 as compared with Comparative Example 2-1 in which the "A" was not blended in the water-based ink. In Example 2-1, the discharge performance, the solubility, and the vaporization characteristic were also excellent. Further, the fungus resistance (antifungal performance) was also excellent in Example 2-1 in which the "A" was blended.

As described above, the water-based ink of the present teaching makes it possible to improve the optical density (OD value) of the recorded matter based on the use of the water-based ink even when the colorant concentration is not raised. Further, the fungus resistance (antifungal performance) is also applied thereto. The way of use of the water-based ink of the present teaching is not specifically limited, which can be widely applied to various types of the ink-jet recording.

What is claimed is:

1. A water-based ink for ink-jet recording comprising:
a colorant;
water;
a surfactant; and
a mixture of a compound represented by the following formula (1a) and a compound represented by the following formula (1b),
wherein a weight ratio (1a)/(1b) of a blending amount of the compound represented by the formula (1a) to a blending amount of the compound represented by the formula (1b) is 0.5 to 2:

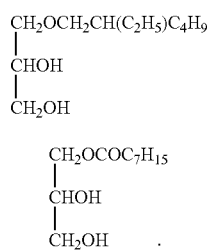

2. The water-based ink for ink-jet recording according to claim 1, wherein a weight ratio (B/A) of a blending amount (B) of the surfactant to a blending amount (A) of the mixture of the compound represented by the formula (1a) and the compound represented by the formula (1b) is 5 to 20.

3. The water-based ink for ink-jet recording according to claim 1, wherein the mixture of the compound represented by the formula (1a) and the compound represented by the formula (1b) is contained in the water-based ink by not more than 0.5% by weight.

4. The water-based ink for ink-jet recording according to claim 1, wherein a weight ratio (A/C) of a blending amount (A) of the mixture of the compound represented by the formula (1a) and the compound represented by the formula (1b) to a blending amount (C) of the colorant is 0.025 to 0.25.

5. The water-based ink for ink-jet recording according to claim 1, wherein the surfactant includes an anionic surfactant.

6. The water-based ink for ink-jet recording according to claim 1, wherein the surfactant includes an anionic surfactant and a nonionic surfactant.

7. The water-based ink for ink-jet recording according to claim 6, wherein each of the anionic surfactant and the nonionic surfactant has an ethylene oxide group.

8. The water-based ink for ink-jet recording according to claim 7, wherein the anionic surfactant has ether carboxylic acid salt or ether sulfuric acid ester salt, and the nonionic surfactant is acetylene glycol-based nonionic surfactant.

9. The water-based ink for ink-jet recording according to claim 8, wherein the acetylene glycol-based nonionic surfactant is a surfactant represented by the following formula (2):

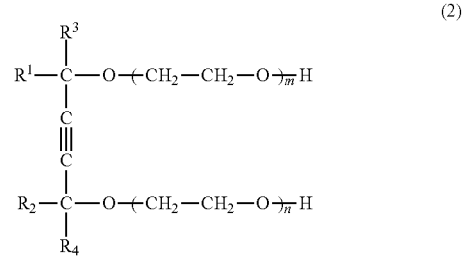

in the formula (2), m and n are identical to each another or are different from each other, and m and n are integers satisfying m+n=1 to 15; and each of $R^1$, $R^2$, $R^3$, and $R^4$ is a straight or branched chain alkyl group having 1 to 5 carbon atoms, and $R^1$, $R^2$, $R^3$, and $R^4$ are identical to one another or are different from one another.

10. The water-based ink for ink-jet recording according to claim 6, wherein the nonionic surfactant is an acetylene glycol-based nonionic surfactant.

11. The water-based ink for ink-jet recording according to claim 1, wherein the colorant is a pigment.

12. The water-based ink for ink-jet recording according to claim 1, wherein the colorant is a self-dispersible pigment.

13. The water-based ink for ink-jet recording according to claim 11, wherein the pigment is contained in the water-based ink by 2% by weight to 6% by weight.

14. The water-based ink for ink-jet recording according to claim 1, further comprising 20% by weight to 22% by weight of glycerol.

15. The water-based ink for ink-jet recording according to claim 14, wherein a weight ratio (G/C) of a blending amount (G) of glycerol to a blending amount (C) of the colorant is 5.0 to 5.4.

16. An ink cartridge which comprises the water-based ink for ink-jet recording as defined in claim 1.

17. A water-based ink for ink-jet recording comprising:
a colorant;
water;
a surfactant; and
a compound represented by the following formula (1), wherein a weight ratio (B/A) of the blending amount (B) of the surfactant to a blending amount (A) of the compound represented by the formula (1) is 5 to 20,

  (1)

wherein in the formula (1), R is an alkyl ether group or an alkyl ester group in which a number of carbon atoms of a main chain is not less than 6, and each of alkyl group of the alkyl ether group and an alkyl group of the alkyl ester group is in a straight chain form or a branched chain form.

18. The water-based ink for ink-jet recording according to claim 17, wherein in the formula (1), R is the alkyl ether group or the alkyl ester group in which the number of carbon atoms of the main chain is 6 to 8.

19. The water-based ink for ink-jet recording according to claim 17, wherein the compound represented by the formula (1) is at least one of a compound represented by the following formula (1a) and a compound represented by the following formula (1b):

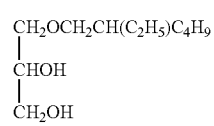 (1a)

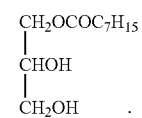 (1b)

20. The water-based ink for ink-jet recording according to claim 19, wherein the compound represented by the formula (1) is a mixture of the compound represented by the formula (1a) and the compound represented by the formula (1b), or the compound represented by the formula (1a).

21. The water-based ink for ink-jet recording according to claim 20, wherein:
the compound represented by the formula (1) is the mixture of the compound represented by the formula (1a) and the compound represented by the formula (1b); and
a weight ratio (1a)/(1b) of a blending amount of the compound represented by the formula (1a) to a blending amount of the compound represented by the formula (1b) is 0.5 to 2.

22. The water-based ink for ink-jet recording according to claim 17, wherein the compound represented by the formula (1) is contained in the water-based ink by not more than 0.5% by weight.

23. The water-based ink for ink-jet recording according to claim 17, wherein a weight ratio (A/C) of a blending amount (A) of the compound represented by the formula (1) to a blending amount (C) of the colorant is 0.025 to 0.25.

24. The water-based ink for ink-jet recording according to claim 17, further comprising 20% by weight to 22% by weight of glycerol.

25. The water-based ink for ink-jet recording according to claim 24, wherein a weight ratio (G/C) of a blending amount (G) of glycerol to a blending amount (C) of the colorant is 5.0 to 5.4.

* * * * *